United States Patent Office 3,053,500
Patented Sept. 11, 1962

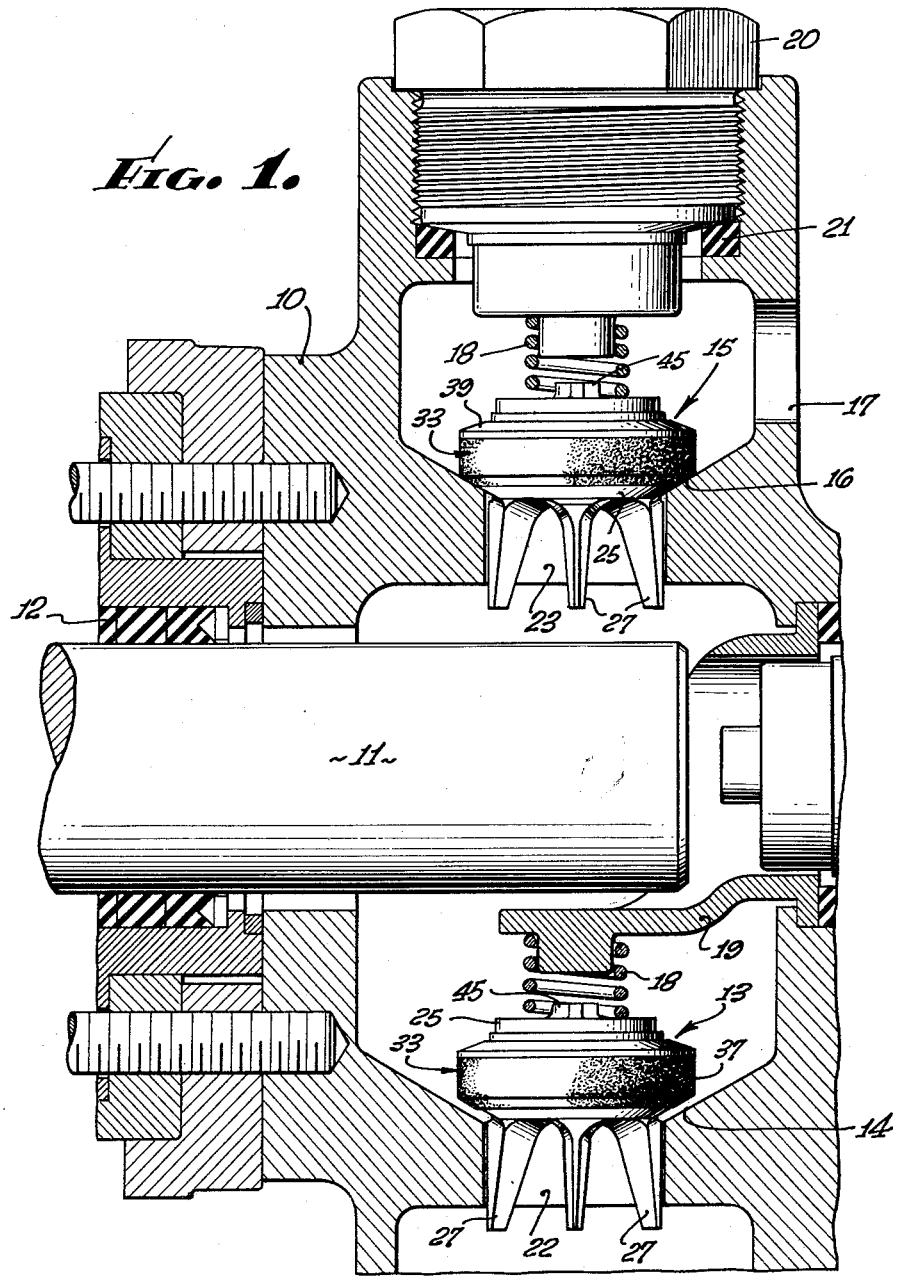

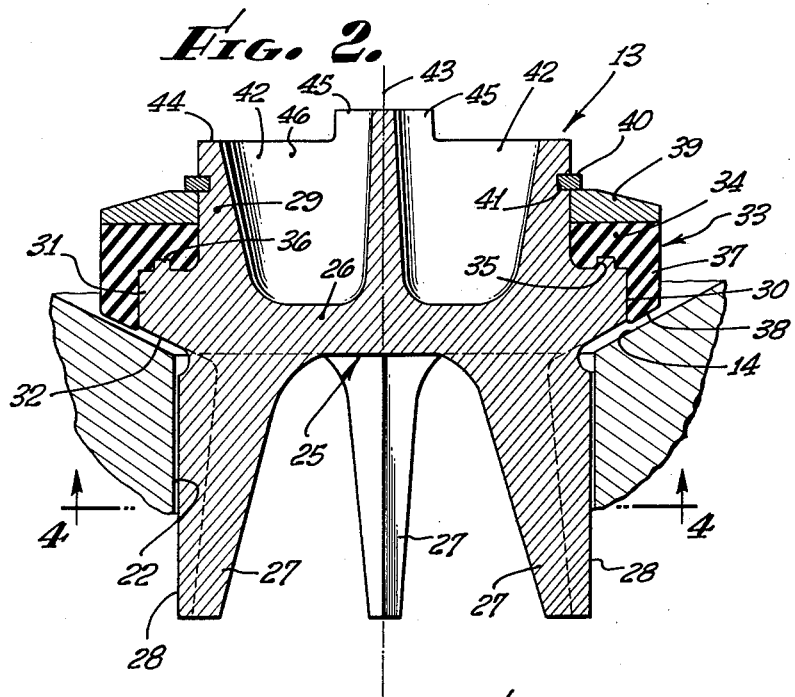
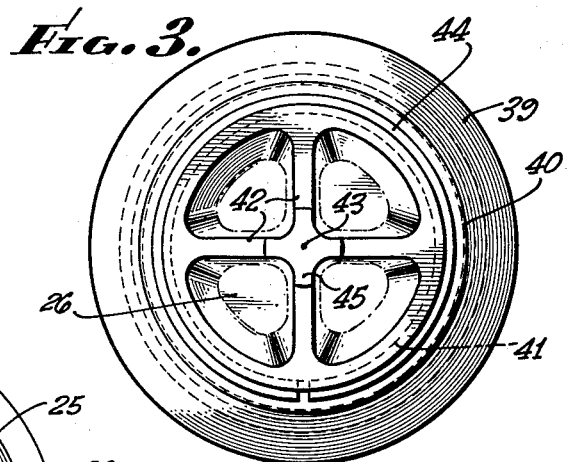
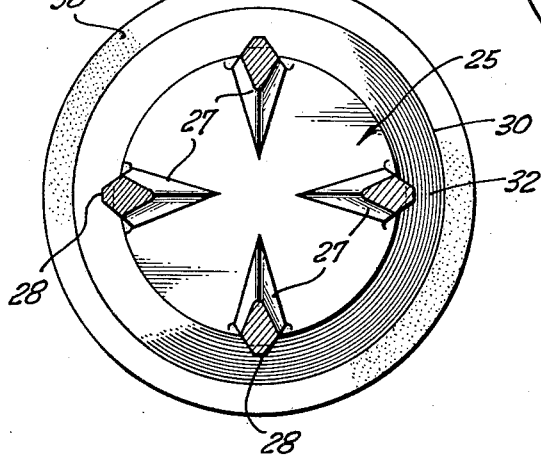

3,053,500
VALVE APPARATUS
Stanley H. Atkinson, Compton, Calif., assignor to Ute Industries, Inc., Long Beach, Calif., a corporation of California
Filed Dec. 5, 1957, Ser. No. 700,838
2 Claims. (Cl. 251—332)

The present invention relates to valve apparatus, and more particularly to valves subjected to relatively high pressure differentials.

Certain types of valve members, such as the inlet and discharge valves of a pump, are subjected intermittently to relatively high presures. Heretofore, these valve members have had a comparatively short life, in view of the severe conditions imposed upon them. High pressure differentials tend to deflect the valve member, causing improper engagement with its companion seat and concentration of the load over relatively small seating areas, subjecting the parts to high unit stresses and their early failure. Attempts at strengthening the valve member by increasing the thickness of its several portions increases its dimensions inordinately and also its weight, introducing relatively large inertia forces that must be overcome in connection with the intermittent movement of the valve member to and from engagement with its seat.

Accordingly, it is an object of the present invention to provide a valve member adapted to intermittently contact a companion valve seat, which is capable of withstanding high pressures, has a relatively long life, and is of lighter construction in proportion to its strength.

Another object of the invention is to provide an intermittently actuatable valve member having only an insignificant deflection when subjected to high pressure differentials, insuring proper surface contact of the valve member with its companion seat and distribution of the high pressure loads imposed on the valve member over a large area of the valve seat.

A further object of the invention is to provide an intermittently actuatable valve member subjected to high pressure differentials, which is rigid, having very little deflection, and which is of relatively small size for the operating conditions to which it is subjected. Despite its greatly increased strength, the size of the valve member is essentially the same as weaker valve members, and can readily replace such other valve members after they have become worn in service.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a longitudinal section through a fluid pump embodying the valve apparatus;

FIG. 2 is an enlarged longitudinal section through one of the valve devices illustrated in FIG. 1;

FIG. 3 is a top plan view of the valve device shown in FIG. 2;

FIG. 4 is a cross-section taken along the line 4—4 on FIG. 2.

The valve apparatus exemplifying the invention is disclosed in FIG. 1 as being embodied within a pump, which may be a high pressure pump for delivering fluent material, such as cement slurry, under high pressure into a well bore. The pump may be of the type that will impose a pressure of as much as 10,000 or 15,000 p.s.i. on the fluent material, which it receives and discharges.

As specifically illustrated, the pump includes a cylinder 10 of any suitable construction having a plunger or piston 11 reciprocable therein, leakage from the cylinder along the piston being prevented by any suitable packing 12 which sealingly engages its periphery. The pump has an inlet or intake valve member 13 adapted to engage its companion seat 14, and also an outlet or discharge valve member 15 adapted to engage its companion valve seat 16. The inlet valve 13 will open automatically on the suction stroke of the plunger or piston 11, whereas the discharge valve 15 will close on such stroke. On the power stroke of the piston, the inlet valve 13 will seat automatically, whereas the discharge valve 15 will be elevated or removed from its seat 16, so that the fluent material can pass around the valve member 15 and out through the discharge passage 17 of the pump.

Each valve member has the usual helical compression spring 18 bearing thereagainst to urge it into engagement with its seat. In the case of the inlet valve, the helical compression member 18 engages an arm 19 extending from the end portion of the cylinder, whereas the outlet or discharge member 15 has its spring 18 engaging a closure plug 20 threaded in the cylinder 10 and engaging a suitable packing 21 to prevent leakage around the plug.

As shown in the drawings, the inlet and the outlet valve seats 14, 16 surround respective inlet and outlet passages 22, 23, these valve seats being tapered and being engageable by a companion valve device, which will close each passage against the flow of fluid in one direction only. Since the inlet and outlet valve devices 13, 15 may be alike, a description of one, such as the inlet valve 13, will suffice for both.

The valve device 13 includes a valve member 25 having a central plate portion 26 from which depend circumferentially spaced and longitudinally extending guide legs or wings 27, which are receivable within the passage 22. The outer surfaces 28 of the guide elements lie on a circle which corresponds to the diameter of the passage wall so that the valve member is centered with respect to the passage and the valve seat 14 surrounding the latter. The plate portion 26 is integral with a cylindrical or hoop portion 29 near its outer margin which extends longitudinally therefrom in a downstream direction with respect to the flow of the fluid or fluent material through the passage 22 and with respect to the valve device 13. This cylindrical or hoop portion is disposed laterally inwardly of the periphery 30 of a circumferential outer section 31 of the plate portion 26 of the valve device, this circumferential outer section actually constituting a cantilever portion having a tapered surface 32 companion to and adapted to engage the tapered valve seat 14. The outer section 31 is designated a cantilever portion inasmuch as it extends outwardly beyond the cylindrical portion 29 and is supported only at its inner end.

The tapered surface 32 of the cantilever portion 31 engages the valve seat 14 to prevent return flow of fluid along the valve seat and in through the passage 22 that the valve seat surrounds. To insure against leakage of fluid when the valve device is closed against its seat, a rubber or rubber-like annular seal member 33 is mounted on the valve device 25. As specifically disclosed, the seal member 33 includes an annular base 34 surrounding the cylindrical portion 29 of the valve device, this base having a circumferential groove 35 in its inner face receiving a circular rib 36 extending from the cantilever portion 31 of the valve device. The seal 33 also includes a generally cylindrical skirt portion 37 integral with the base portion 34 and encompassing the periphery 30 of the cantilever portion of the valve device. This skirt portion has a terminal tapered surface 38 which extends slightly beyond the tapered surface 32 on the cantilever portion when disengaged from the seat 14, but which has essentially the same slope as the valve seat 14, in order to sealingly engage the latter, and prevent leakage through the valve seat when the valve member 25 is closed against the latter.

The annular seal member 33 is retained in assembled position on the metallic portion 25 of the valve device by an annular holding member 39 surrounding the cylindrical portion 29 of the valve device and engaging the outer surface of the seal member base 34. This annular holding member is retained in place by a split inherently contractile retainer ring 40 mounted within a peripheral groove 41 in the cylindrical portion 29 of the valve device and overlying and engaging the outer surface of the holding member or plate 39.

The valve device 25 also includes generally radial ribs 42 which are integral with the cylindrical portion 29 of the valve device and with one another at the region of the axis 43 of the device. These ribs 42 are not only integral with the cylindrical portion 29 of the valve device and with one another, but also with the plate portion 26 of the valve device. The ribs 42 may terminate at the outer end 44 of the cylindrical portion, but their inner portions 45 extend outwardly beyond the outer end of the cylindrical portion for the purpose of centering the valve closing compression spring 18, which surround the radial outer ends of the inner portions 45 of the ribs and rest upon their adjacent portions 46, such radial outer ends being equidistant from the axis 43 of the device.

In the operation of the intake valve device 13, the latter will open automatically on the suction stroke of the piston plunger 11, and will close on its discharge or pressure stroke. During such discharge, the valve member is subjected to pressure, forcing it against its seat 14 and also its seal member 33 against the seat. Where very high pressures are encountered, the tendency is for the pressures to deflect the plate portion 26 in a direction toward the passage 22, which will also tend to deflect the cantilever portion 31. If the plate portion 26 and its cantilever portion 31 were to deflect, the slope of the tapered surface 32 of the cantilever portion would change and would not be the same as the slope of the valve seat 14. As a result, when the cantilever portion is engaged with the valve seat, only a circumferential line of contact would be achieved between the parts, resulting in an exceedingly high cencentration of load on the valve seat 14, as well as on the valve member itself, resulting in rapid and excessive wear on the parts and their relatively short life.

In the present instance, the plate portion 26 and its cantilever portion 31 are prevented from deflecting under high pressure operating conditions. The tendency for the plate portion and its outer or cantilever portion to deflect is resisted by the cylindrical portion 29 and also by the ribs 42, which are integral with the cylindrical portion 29, the plate portion 26, and one another. The ribs 42 function as cross-members or beams secured to the plate portion 26 and the cylindrical portion 29 to prevent deflection of the plate portion. Not only do they minimize the deflection of the plate portion 26 substantially, to the point of insignificance, under high pressure operating conditions, but they also provide rigidity in the entire construction. While providing rigidity in the construction and preventing any material deflection of the plate portion of the device, the ribs do not add materially to the weight of the valve device. In fact, the rib construction will even permit the plate portion 26 inwardly of the cylindrical portion 29 to be made thinner than heretofore, and yet not partake of any significant deflection under high pressure operating conditions. The ribs 42 are deep, and there are relatively large spaces therebetween, resulting in a relatively light construction.

The outer cantilever part 31 of the plate portion is a short, heavy section integral with the cylindrical portion or wall 29, possessing only a small or insignificant deflection under high pressure conditions when engaged with its companion valve seat 14. The deflection of this outer portion is resisted by the cylindrical portion 29, the deflection of the cantilever portion under load tending to collapse the cylinder 29 inwardly, which collapse is readily resisted by the thickness of the cylinder wall and also by the ribs 42 extending across the cylindrical portion.

It is evident that during the reciprocation of the valve member 13 with respect to its seat 14, as a result of the operation of the device, the valve member is brought intermittently into and out of engagement with its companion valve seat. The relatively large unit pressures to which the valve is subjected cannot deflect it, its seating surface 32 remaining at a constant slope for large degrees of pressure changes or differentials, and engaging the companion valve seat 14 along the desired surface of contact, rather than along varying circumferential lines of contact, thus holding the unit bearing pressure to a relatively low value and insuring long life of the valve device. Both the cylindrical portion 29 and the ribs 42 provide essential rigidity to the valve structure, without significantly adding to its weight. Due to its increased strength and bearing capacity relative to its weight, the valve can better resist and withstand the inertia forces resulting from its movement or reciprocation, which contributes to less wear on the valve seat 14, as well as on the valve member itself, increasing the life of the valve device materially.

The ribs 42 not only serve to reinforce the entire structure to a considerable extent, but they serve as a seat for the valve closing spring 18.

Despite its relatively light weight and its extreme rigidity, the valve device is not substantially much different in over-all dimensions than other valve devices, and can be used as an interchangeable part for such other valve devices after the latter have become worn in service. For that matter, the same valve closing spring 18 can be used, since it is found that the distance between the ends of the ribs 42 against which the spring bears and the spring seat against which the other end of the spring bears is not significantly different.

The inventor claims:

1. A valve device adapted to engage a companion valve seat, comprising a plate portion having a seat engaging surface, a generally cylindrical portion secured to and extending from the plate portion in a direction away from said surface, ribs within said generally cylindrical portion integral with each other, with said plate portion, and with said generally cylindrical portion, said surface being disposed on a part of said plate portion which is cantilevered laterally outwardly beyond said generally cylindrical portion, and pliant, elastic seal means adapted to engage the valve seat, said seal means including a base portion disposed around said cylindrical portion in engagement with said part and a skirt portion extending axially from said base portion and disposed around the periphery of said part and engageable with a valve seat, said part having a circumferential rib received within a companion circumferential groove in said base portion.

2. A valve device adapted to engage a companion valve seat, comprising a plate portion having a seat engaging surface, a generally cylindrical portion integral with and extending from asid plate portion in a direction away from said surface, and generally radial ribs within said generally cylindrical portion integral with said plate portion, with said generally cylindrical portion and with each other in the region of the axis of said generally cylindrical portion, said ribs having outer portions adjacent to said generally cylindrical portion extending substantially to the outer end of said generally cylindrical portion, said ribs having an inner portion where they are integral with each other extending axially outwardly beyond said outer portions, the extending inner portions having their radial outer ends equidistant from said axis, whereby said extending inner portions are adapted to center an encompassing coil spring adapted to engage the outer ends of said outer portions.

References Cited in the file of this patent

UNITED STATES PATENTS

| | | |
|---|---|---|
| 156,411 | Dale | Nov. 3, 1874 |
| 898,172 | Bennett | Sept. 8, 1908 |
| 1,095,759 | White | May 5, 1914 |
| 1,161,460 | Doble | Nov. 23, 1915 |
| 1,859,739 | Keating | May 24, 1932 |
| 1,929,310 | Greve | Oct. 3, 1933 |
| 1,990,557 | Melott | Feb. 12, 1935 |
| 2,093,662 | Steirly | Sept. 21, 1937 |
| 2,521,314 | Therolf | Sept. 5, 1950 |

FOREIGN PATENTS

| | | |
|---|---|---|
| 918,616 | Germany | of 1954 |